United States Patent [19]
Kreitzer

[11] 4,333,714
[45] Jun. 8, 1982

[54] COMPACT WIDE ANGLE LENS

[75] Inventor: Melvyn H. Kreitzer, Cincinnati, Ohio

[73] Assignee: Vivitar Corporation, Santa Monica, Calif.

[21] Appl. No.: 118,519

[22] Filed: Feb. 4, 1980

Related U.S. Application Data

[63] Continuation-in-part of Ser. No. 941,529, Sep. 11, 1978, abandoned.

[51] Int. Cl.³ .............................................. G02B 13/04
[52] U.S. Cl. ...................................... 350/460; 350/461
[58] Field of Search ................................ 350/460, 461

[56] References Cited

U.S. PATENT DOCUMENTS

| | | | |
|---|---|---|---|
| 3,737,213 | 6/1973 | Yamashita | 350/460 |
| 3,874,770 | 4/1975 | Shimizu | 350/460 |
| 4,046,459 | 9/1977 | Kawamura | 350/460 |
| 4,099,850 | 7/1978 | Matsui | 350/461 |
| 4,145,117 | 3/1979 | Ikeda | 350/460 |

Primary Examiner—F. L. Evans
Assistant Examiner—Rebecca D. Gass
Attorney, Agent, or Firm—Costas, Montgomery & Dorman

[57] ABSTRACT

A retrofocus lens having a field angle of up to 76° and comprising as few as six elements. A strongly negative front group of only two elements contributes to the compactness of the lens.

7 Claims, 4 Drawing Figures

TANGENTIAL FIG 3 SAGITTAL
(37.84°)
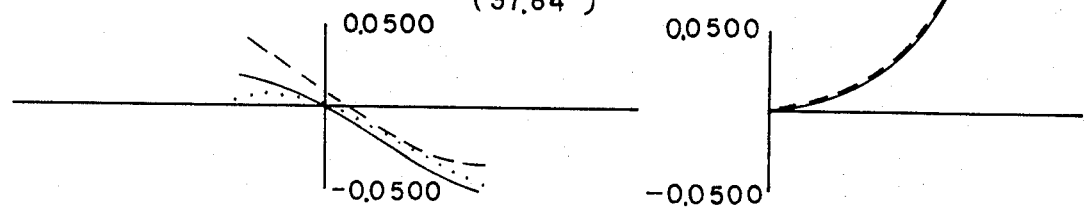
(28.58°)
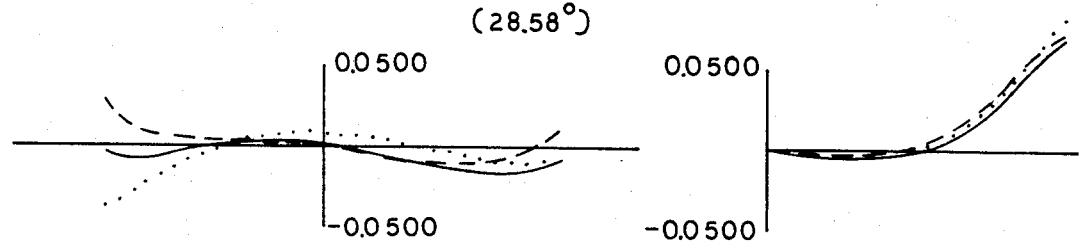
(19.65°)
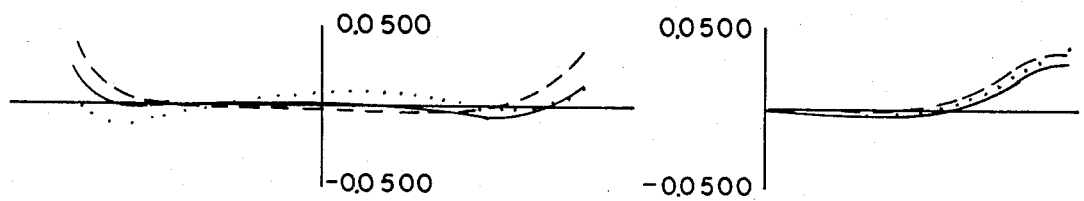
(0.00°)
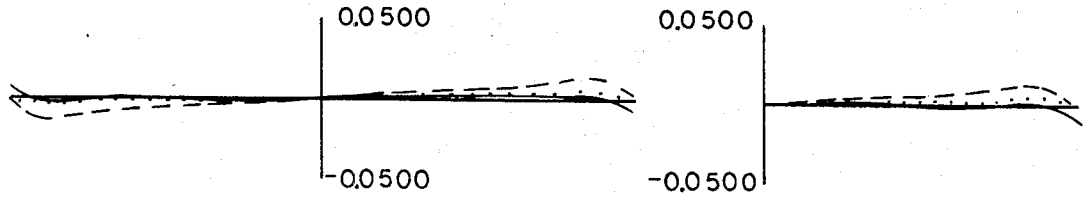
------ 480.0 MM
─────── 546.1 MM
· · · · · · 643.8 MM

COMPACT WIDE ANGLE LENS

This application is a continuation-in-part of application Ser. No. 941,529, filed Sept. 11, 1978, now abandoned.

The present invention relates to an improved optical system and more particularly relates to a lens of the retrofocus type subtending a field angle of 75° or more which is quite compact and requires only six or seven elements.

Wide angle lenses for use with interchangeable lens cameras, such as cameras of the 35 mm format, have been improved as to size, bulk, weight and optical characteristics as well as relative cost over the last few years. However, further improvements, particularly more compactness and decreased relative cost while maintaining and improving the degree of optical correction are desirable.

A wide angle lens of the inverted telephoto type generally includes a group of a strong negative power at the front of the lens followed by a strong positive power at the rear thereof. Generally, these strong powers together with the highly asymmetric form of the lens make certain aberrational corrections difficult, which difficulty increases with increasing power of the front group. However, an improved exceedingly compact and well corrected wide angle lens of moderate cost is provided according to the present invention. A lens according to the present invention is capable of covering field angles of up to 75° or more at a relative aperture of f/2.8.

Briefly stated, a lens according to the invention comprises as little as six or seven elements in three groups. The first group comprises a positive element followed by a strongly negative meniscus to yield a group of overall negative power; the second group comprises one or two positive elements; and the third group comprises a biconcave element, and two positive elements, both concave to the image. The strong negative front group enables the lens to be more compact but increases the aberration correction in the following elements. The compact size and resulting necessary correction is achieved by designing the lens with the following relationship $$1.2k_o > |k_1| > 0.9k_o 1.6k_o > k_2 > 1.2k_o$$

where $k_1$, and $k_2$ are the optical powers of the first and second groups, respectively, and $k_o$ is the power of the overall lens. The third group is of weak optical power and may be of positive or negative power depending on the overall design of the lens.

An object of the present invention is to provide a new and improved compact, well corrected wide angle lens using only a minimum of elements.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

FIG. 3 is a series of graphical representations of various aberrations of the lens system of FIG. 1 and Table I plotted as deviation at various semi-field angles for tangential and sagittal fans.

Figure 1:
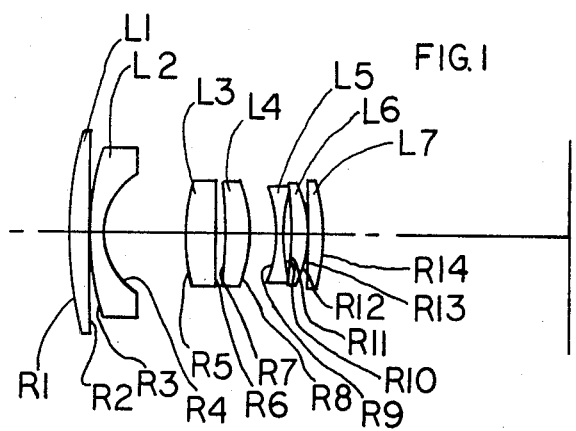
FIG. 1 is a diagrammatic sectional view of an optical system embodying the invention.

Referring to the drawings, a wide angle lens of the inverted telephoto type having a relatively long back focal length is shown. The lens is designed to be compact, yet to have optimum balance of distortion and aberrations. To achieve the long back focus while keeping the lens as compact as possible, the front group of the lens is provided with strong negative power which is balanced in the following groups. The second group is of relatively strong positive power while the third group is of relatively weak power and may be either positive or negative. Although these strong powers of the first and second groups, together with the highly asymmetric form of the lens, make the correction of coma, lateral color and distortion particularly troublesome, extremely good correction of aberrations has been achieved without the use of an excessive number of elements or of expensive high index glass.

Shown in FIG. 1 is an embodiment of an optical system forming a seven element objective lens capable of covering a total field angle of about 76° at a relative aperture of f/2.8. The first group G1 comprises a positive element L1 and a strongly negative meniscus L2 convex to the object. This front group is followed by a second group G2 comprising two air spaced positive elements L3 and L4 having extreme convex surfaces. The third group comprises a biconcave element L5, followed by two positive elements L6 and L7. Group G3 is of overall weak power and may be positive or negative, determined by the power of group G2. The first group is made strongly negative to make the lens more compact with the use of only two elements.

A lens as described above is substantially described in Tables I-III which sets forth data as to the dimensions, parameters, and optical materials of the lens of FIG. 1 as scaled to EFL's of essentially 28 mm for a 24×36 mm image frame with a relative aperture of f/2.8.

TABLE I

| Element | Surface Radii (mm) | Axial Distance Between Surfaces (mm) | $N_d$ | $V_d$ |
|---|---|---|---|---|
| L1 | R1 = 61.850 | | | |
| | | 3.08 | 1.564 | 60.8 |
| | R2 = 525.960 | | | |
| | | 0.20 | | |
| L2 | R3 = 43.704 | | | |
| | | 2.00 | 1.658 | 57.3 |
| | R4 = 10.686 | | | |
| | | 13.51 | | |
| L3 | R5 = 27.960 | | | |
| | | 5.00 | 1.723 | 38.0 |
| | R6 = −88.640 | | | |
| | | 1.38 | | |
| L4 | R7 = −51.100 | | | |
| | | 4.00 | 1.613 | 58.6 |
| | R8 = −19.674 | | | |
| | | 4.22 | | |
| L5 | R9 = −15.412 | | | |
| | | 1.50 | 1.785 | 26.1 |
| | R10 = 56.410 | | | |
| | | 0.85 | | |

TABLE I-continued

| Element | Surface Radii (mm) | Axial Distance Between Surfaces (mm) | $N_d$ | $V_d$ |
|---|---|---|---|---|
| L6 | R11 = −71.028 | | | |
| | | 2.60 | 1.720 | 50.3 |
| | R12 = −17.375 | | | |
| | | 0.20 | | |
| | R13 = −239.300 | | | |
| L7 | | 2.46 | 1.697 | 55.5 |
| | R14 = −26.573 | | | |

BFL = 39.0mm

In the above table, the first column lists lens elements from the object end, the second column lists the surfaces of the lens elements numerically starting at the ray entrance side of the system. The third column lists the radii for the respective surfaces of the elements with the positive values of the radii indicating surfaces which are convex to the ray entrance and the negative values (−) of the radii indicating surfaces which are concave. The fourth column lists the thickness of the element and the spacing therebetween. The fifth and sixth columns list respectively the refractive index $N_d$ and the dispersive index $V_d$ of the element.

Figure 2A:
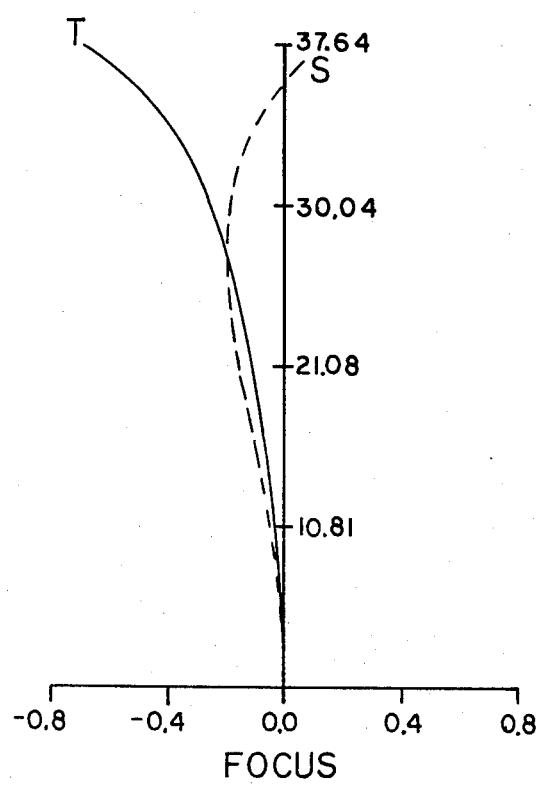
FIG. 2A is a graphical representation of the astigmatic field curves of the lens system shown in FIG. 1, having the design data given in Table I with deviation plotted in millimeters against semi-field angle as ordinate.
Figure 2B:
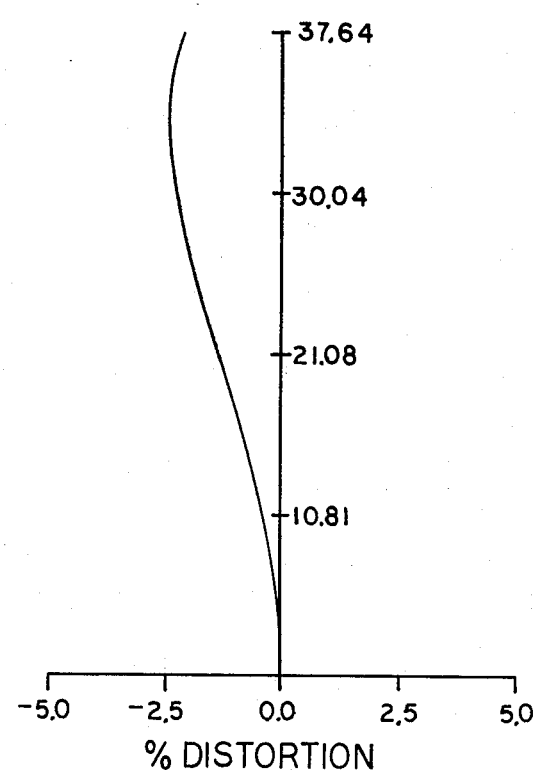
FIG. 2B is a graphical representation of the distortion of the lens of FIG. 1 and Table I, plotted as a percentage deviation from a "perfect" image with semi-field angle as ordinate.

FIGS. 2A, 2B and 3 exemplify the good degree of correction achieved in this compact, seven element lens.

FIG. 2A represents astigmatic field curves for transverse tangential (T) and sagittal (S) field curvature, respectively, as shown in solid and dotted lines. FIG. 2B represents the distortion plotted as a percentage deviation from a "perfect" image. FIG. 3 graphically represents various transverse ray aberrations of the optical system shown in FIG. 1 and having the design data set forth in Table I above. The dashed line curve represents the axial ray bundle for 480.0 nm wavelength; the solid line is for 546.1 nm wavelength; and the dotted line is for 643.8 nm wavelength.

Another embodiment of a six element lens embodying the invention is exemplified in the following Table II setting forth the same data as Table I, for a lens scaled to 28.5 mm EFL for a 24×36 mm image frame with a relative aperture of f/2.8. In Table II the second group comprises only a single biconvex element L3 and the elements L4–L6 correspond to elements L5–L7 of FIG. 1, respectively.

TABLE II

| Element | Surface Radii (mm) | Axial Distance Between Surfaces (mm) | $N_d$ | $V_d$ |
|---|---|---|---|---|
| L1 | R1 = 86.471 | | | |
| | | 2.33 | 1.623 | 58.1 |
| | R2 = 374.462 | | | |
| | | 0.20 | | |
| L2 | R3 = 34.088 | | | |
| | | 2.20 | 1.623 | 58.1 |
| | R4 = 10.501 | | | |
| | | 14.98 | | |
| L3 | R5 = 25.290 | | | |
| | | 10.00 | 1.668 | 41.9 |
| | R6 = −21.220 | | | |
| | | 3.85 | | |
| L4 | R7 = −15.006 | | | |
| | | 1.50 | 1.805 | 25.5 |
| | R8 = 47.997 | | | |
| | | 0.90 | | |
| L5 | R9 = −83.296 | | | |
| | | 2.71 | 1.743 | 49.2 |
| | R10 = −16.598 | | | |
| | | 0.20 | | |
| | R11 = −105.513 | | | |

TABLE II-continued

| Element | Surface Radii (mm) | Axial Distance Between Surfaces (mm) | $N_d$ | $V_d$ |
|---|---|---|---|---|
| L6 | | 2.13 | 1.697 | 55.5 |
| | R12 = −29.517 | | | |

BFL = 38.3mm

A third seven element embodiment of the invention is substantially described in Table III as scaled to an EFL of 28 mm for an image frame of 24×36 mm with a relative aperture of f/2.8.

TABLE III

| Element | Surface Radii (mm) | Axial Distance Between Surfaces (mm) | $N_d$ | $V_d$ |
|---|---|---|---|---|
| L1 | R1 = 170.472 | | | |
| | | 2.57 | 1.564 | 60.8 |
| | R2 = −252.972 | | | |
| | | 0.20 | | |
| L2 | R3 = 46.367 | | | |
| | | 2.00 | 1.697 | 55.5 |
| | R4 = 11.708 | | | |
| | | 13.47 | | |
| L3 | R5 = 27.026 | | | |
| | | 4.00 | 1.742 | 40.3 |
| | R6 = −125.440 | | | |
| | | 3.63 | | |
| L4 | R7 = −53.969 | | | |
| | | 3.50 | 1.617 | 53.9 |
| | R8 = −20.998 | | | |
| | | 4.20 | | |
| L5 | R9 = −15.672 | | | |
| | | 1.40 | 1.785 | 26.1 |
| | R10 = 56.810 | | | |
| | | 0.79 | | |
| L6 | R11 = −85.457 | | | |
| | | 2.63 | 1.720 | 50.3 |
| | R12 = −17.668 | | | |
| | | 0.2 | | |
| L7 | R13 = −942.934 | | | |
| | | 2.41 | 1.697 | 55.5 |
| | R14 = −29.266 | | | |

BFL = 38.8

Table IV sets forth the various powers $k_1$, $k_2$, $k_3$ of the lens groups G1, G2, and G3, respectively, and the ratios thereof to the overall power, $k_o$, of the lenses.

TABLE IV

| TABLE | $k_1$ | $k_2$ | $k_3$ | $k_1/k_o$ | $k_2/k_o$ | $k_3/k_o$ |
|---|---|---|---|---|---|---|
| I | −.0359 | .0485 | .0033 | −1.004 | 1.359 | .092 |
| II | −.0331 | .0529 | −.0037 | −.944 | 1.508 | −.105 |
| III | −.0373 | .0470 | .0041 | −1.043 | 1.314 | .115 |

The first group of only two elements is strongly negative, contributing to compact size of the lens while the second group contributes most of the positive power. The third group is of weak optical power and may be either positive or negative depending on the balancing of power in the overall design.

The disclosed lenses satisfy the conditions $$1.2k_o > |k_1| > 0.9k_o$$

and $$1.6k_o > k_2 > 1.2k_o$$

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A retrofocus lens comprising from the object end, a first group of negative power consisting of a positive element and a negative meniscus convex to the object, a second group having convex object and image side surfaces, and a third group comprising a biconcave element and two positive elements convex to the image end, and $$1.2k_o > |k_1| > 0.9k_o$$

$$1.6k_o > k_2 > 1.2k_o$$

where
$k_o$ is the optical power of the lens,
$k_1$ is the absolute optical power of the first group,
$k_2$ is the optical power of the second group, and the third group is of relatively weak optical power.

2. The lens of claim 1 where said second group comprises two elements.

3. The lens of claim 1 where said second group comprises a single element.

4. The lens of claim 1 where said second group consists of two air-spaced elements.

5. A lens according to claim 1 as scaled to an equivalent focal length of 28 mm for an image frame of 24×36 mm defined substantially as follows:

| Element | Surface Radii (mm) | Axial Distance Between Surfaces (mm) | $N_d$ | $V_d$ |
|---|---|---|---|---|
| L1 | R1 = 61.850 | | | |
| | | 3.08 | 1.564 | 60.8 |
| | R2 = 525.960 | | | |
| | | 0.20 | | |
| L2 | R3 = 43.704 | | | |
| | | 2.00 | 1.658 | 57.3 |
| | R4 = 10.686 | | | |
| | | 13.51 | | |
| L3 | R5 = 27.960 | | | |
| | | 5.00 | 1.723 | 38.0 |
| | R6 = −88.640 | | | |
| | | 1.38 | | |
| L4 | R7 = −51.100 | | | |
| | | 4.00 | 1.613 | 58.6 |
| | R8 = −19.674 | | | |
| | | 4.22 | | |
| L5 | R9 = −15.412 | | | |
| | | 1.50 | 1.785 | 26.1 |
| | R10 = 56.410 | | | |
| | | 0.85 | | |
| L6 | R11 = −71.028 | | | |
| | | 2.60 | 1.720 | 50.3 |
| | R12 = −17.375 | | | |
| | | 0.20 | | |
| L7 | R13 = −239.300 | | | |
| | | 2.46 | 1.697 | 55.5 |
| | R14 = −26.573 | | | | where L1–L7 are the lens elements from the object end; R1–R14 are surface radii from the object end, negative radii being struck from the left and positive from the right; $N_d$ is the index of refraction and $V_d$ is the dispersion as measured by the Abbe number.

6. A lens according to claim 1 as scaled to an equivalent focal length of 28.5 mm for an image frame of 24×36 mm defined substantially as follows:

| Element | Surface Radii (mm) | Axial Distance Between Surfaces (mm) | $N_d$ | $V_d$ |
|---|---|---|---|---|
| L1 | R1 = 86.471 | | | |
| | | 2.33 | 1.623 | 58.1 |
| | R2 = 374.462 | | | |
| | | 0.20 | | |
| L2 | R3 = 34.088 | | | |
| | | 2.20 | 1.623 | 58.1 |
| | R4 = 10.501 | | | |
| | | 14.98 | | |
| L3 | R5 = 25.290 | | | |
| | | 10.00 | 1.668 | 41.9 |
| | R6 = −21.220 | | | |
| | | 3.85 | | |
| L4 | R7 = −15.006 | | | |
| | | 1.50 | 1.805 | 25.5 |
| | R8 = 47.997 | | | |
| | | 0.90 | | |
| L5 | R9 = −83.296 | | | |
| | | 2.71 | 1.743 | 49.2 |
| | R10 = −16.598 | | | |
| | | 0.20 | | |
| L6 | R11 = −105.513 | | | |
| | | 2.13 | 1.697 | 55.5 |
| | R12 = −29.517 | | | | where L1–L6 are the lens elements from the object end; R1–R12 are surface radii from the object end, negative radii being struck from the left and positive from the right; $N_d$ is the index of refraction and $V_d$ is the dispersion as measured by the Abbe number.

7. A lens according to claim 1 as scaled to an equivalent focal length of 28 mm for an image frame of 24×36 mm defined substantially as follows:

| Element | Surface Radii (mm) | Axial Distance Between Surfaces (mm) | $N_d$ | $V_d$ |
|---|---|---|---|---|
| L1 | R1 = 170.472 | | | |
| | | 2.57 | 1.564 | 60.8 |
| | R2 = −252.972 | | | |
| | | 0.20 | | |
| L2 | R3 = 46.367 | | | |
| | | 2.00 | 1.697 | 55.5 |
| | R4 = 11.708 | | | |
| | | 13.47 | | |
| L3 | R5 = 27.026 | | | |
| | | 4.00 | 1.762 | 40.3 |
| | R6 = −125.440 | | | |
| | | 3.63 | | |
| L4 | R7 = −53.969 | | | |
| | | 3.50 | 1.617 | 53.9 |
| | R8 = −20.998 | | | |
| | | 4.20 | | |
| L5 | R9 = −15.672 | | | |
| | | 1.40 | 1.785 | 26.1 |
| | R10 = 56.810 | | | |
| | | 0.79 | | |
| L6 | R11 = −85.457 | | | |
| | | 2.63 | 1.720 | 50.3 |
| | R12 = −17.668 | | | |
| | | 0.2 | | |
| L7 | R13 = −942.934 | | | |
| | | 2.41 | 1.697 | 55.5 |
| | R14 = −29.266 | | | | where L1–L7 are the lens elements from the object end; R1–R14 are surface radii from the object end, negative radii being struck from the left and positive from the right; $N_d$ is the index of refraction and $V_d$ is the dispersion as measured by the Abbe number.

* * * * *